Figure 1:
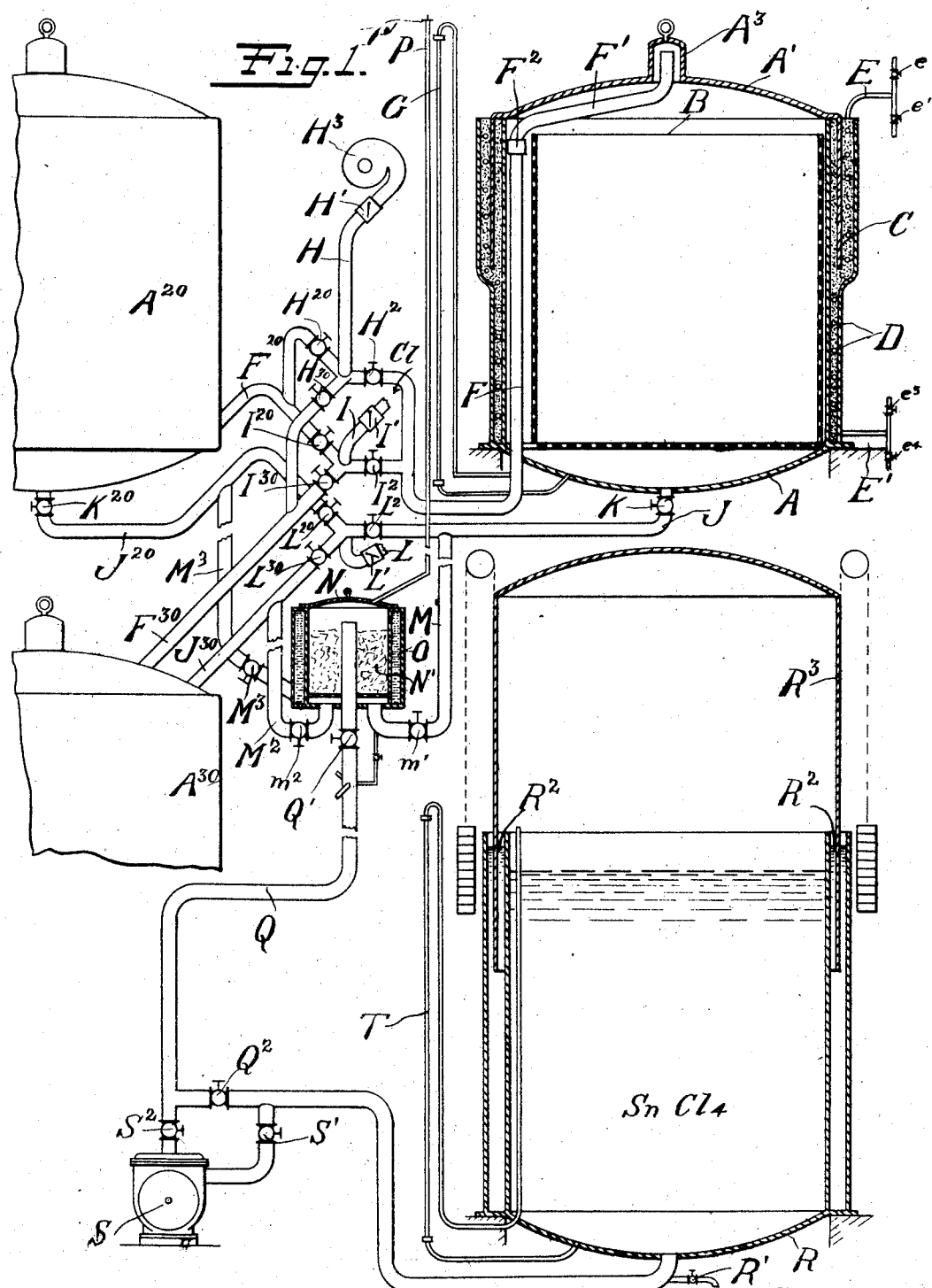

No. 883,411. PATENTED MAR. 31, 1908.
M. LEITCH.
METHOD OF DETINNING TIN SCRAP.
APPLICATION FILED MAY 17, 1907. RENEWED JAN. 10, 1908.

2 SHEETS—SHEET 1.

Witnesses:
Inventor
Meredith Leitch.
By his Attorney's

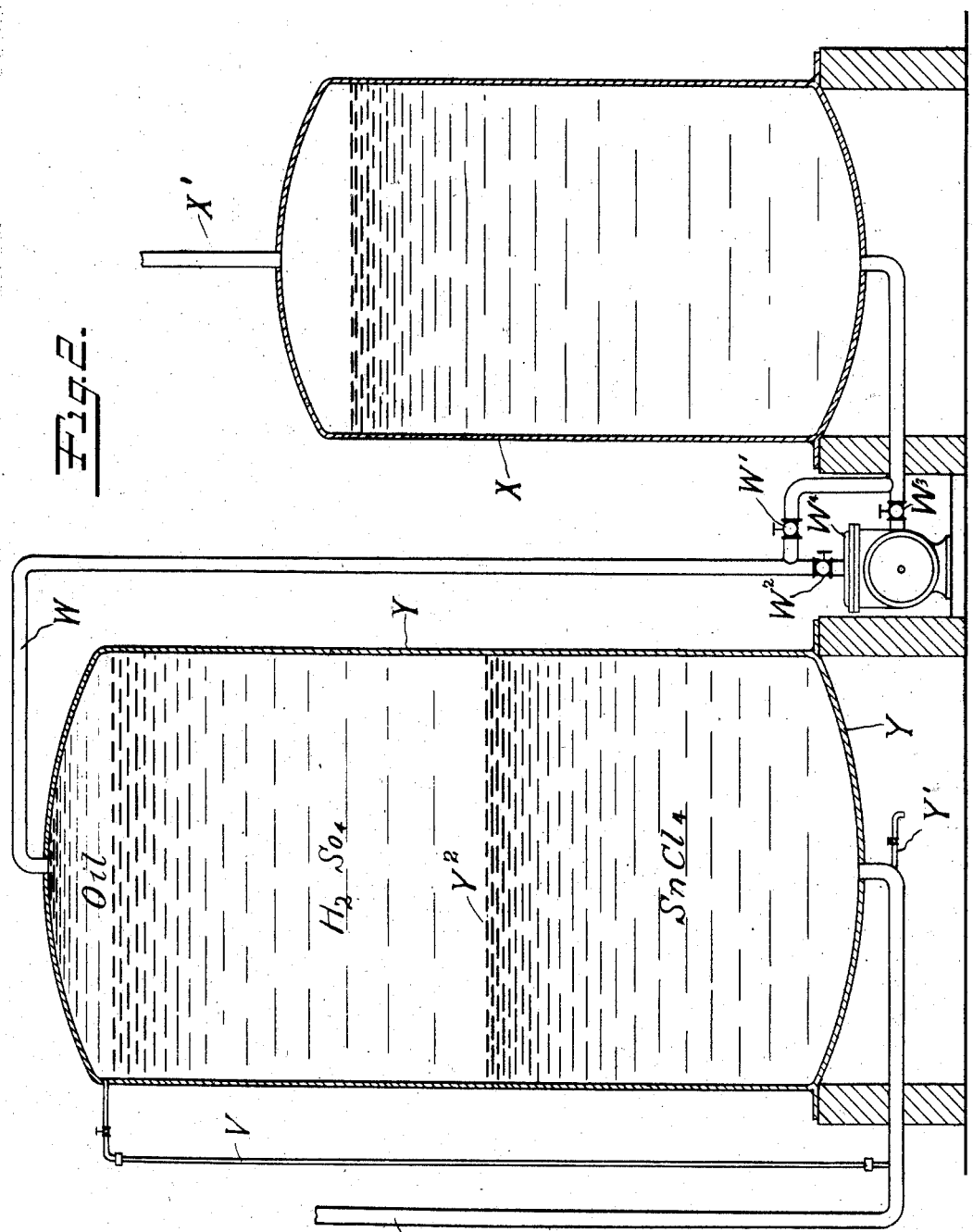

UNITED STATES PATENT OFFICE.

MEREDITH LEITCH, OF ELIZABETH, NEW JERSEY, ASSIGNOR TO METAL PROCESS COMPANY, A CORPORATION OF NEW YORK.

METHOD OF DETINNING TIN-SCRAP.

No. 883,411.   Specification of Letters Patent.   Patented March 31, 1908.

Original application filed November 30, 1906, Serial No. 345,815. Divided and this application filed May 17, 1907, Serial No. 374,131. Renewed January 10, 1908. Serial No. 410,199.

*To all whom it may concern:*

Be it known that I, MEREDITH LEITCH, a citizen of the United States, residing at Elizabeth, county of Union, New Jersey, have invented certain new and useful Improvements in Methods of Detinning Tin-Scrap, of which the following is a full, clear, and exact description.

My invention relates to a method of detinning tin scrap by the use of dry or anhydrous chlorin, and has for its object to avoid many of the difficulties which are found to be present in the use of chlorin gas for detinning, as now practiced.

The presence of air and other gases in the detinning chamber and in the tin scrap prevents or hinders the action of the dry chlorin by diluting it and by keeping it out of the folds and minute spaces in the tin scrap.

In carrying out my invention the tin scrap is submerged in liquid stannic chlorid introduced at the bottom of the chamber and entirely filling the chamber. This drives out all the gases from the chamber and the spaces in the tin scrap so that when the liquid is withdrawn the dry chlorin will follow in after and come in contact with all the surfaces of the tin scrap in as pure and undiluted a state as it can be obtained.

The action of the undiluted chlorin of the tin is very rapid and heat is generated. If undiluted chlorin is allowed to come suddenly in contact with a large body of the tin scrap, the temperature will rise to such a point as to vaporize the stannic chlorid ($SnCl_4$), causing the vapor to mix with the chlorin and interfere with the process of detinning and the recovery of the stannic chlorid. In my process the slow withdrawal of the stannic chlorid from the detinning chamber through an opening in the bottom gradually exposes the scrap above the liquid to chlorin and permits of so controlling the process that too great a rise in temperature is prevented. The result is that the scrap is more uniformly detinned and the stannic chlorid formed is prevented from vaporizing and interfering with the process.

When stannic chlorid is caused to flow through the tin scrap from above in combination with chlorin, the chlorin is greatly dissolved by the stannic chlorid and must be eliminated by a separating process, requiring additional apparatus for the elimination and saving of the chlorin. In my process the stannic chlorid is brought into the chamber quietly from the bottom, in order to drive out the gases and is withdrawn in the same way. The absorption of the chlorin is thereby practically avoided, as the stannic chlorid presents only a level and undisturbed surface.

In detinning ordinary tin scrap some organic matter and anhydrous carbons will be present unless carefully removed, and these will form with the chlorin hydrochloric acid (HCl) which is an undesirable element in the stannic chlorid. This hydrochloric acid when anhydrous is a gas at ordinary pressures and temperatures and is absorbed by the stannic chlorid generated in the chamber. In my process I use a purifying chamber through which all the liquid product of the detinning chamber must pass. This chamber contains tin in very finely divided form which reacts upon the hydrochloric acid converting it into stannic chlorid and hydrogen. The latter is allowed to escape and not interfere with the chlorin in the detinning chamber. In this purifying chamber any dry chlorin dissolved in the stannic chlorid is also acted upon and converted into stannic chlorid, so that the liquid product of the process will not contain free chlorin.

In detinning with dry chlorin, the stannic chlorid forms in globules on the tin scrap and obstructs the action of the chlorin on the tin whenever the temperature of the chamber is below the boiling point of the stannic chlorid. Moreover, the gases generated in the process and not absorbed and any gases admitted along with the chlorin and not absorbed, interfere with the action of the chlorin by diluting it and later filling the chamber and stopping the inflow of chlorin and the detinning process. On the contrary in my process, the chlorin supply is cut off whenever such conditions arise and the detinning chamber is filled from the bottom with liquid stannic chlorid, which collects the globules of stannic chlorid adhering to the scrap and drives out the inert and interfering gases and on being withdrawn brings in a new supply of chlorin, so that the process is kept in operation to completion.

In detinning with dry chlorin below the boiling point of stannic chlorid, at the completion of the process liquid stannic chlorid remains on the detinned steel as moisture and in globules and in the minute spaces, resulting in a loss of the stannic chlorid and a decrease in the value of the steel and moreover is very disagreeable and harmful to persons working the process when the chamber is opened for renewing the charge. My process provides for collecting the stannic chlorid by a final submersion of the detinned steel in stannic chlorid, thus causing the globules to join in the general mass of liquid, and on withdrawing the liquid there is created a high degree of vacuum to vaporize the stannic chlorid which remains as moisture and in the minute spaces. This vaporized stannic chlorid is thus condensed on the cool walls of the detinning chamber, resulting in a saving of the stannic chlorid and removal of it from the steel and making it less disagreeable and harmful to the workmen.

In handling stannic chlorid it has heretofore been difficult to prevent its coming in contact with the air and moisture. In my process I provide for handling the stannic chlorid by pressure from above, the stannic chlorid exerted by another liquid having no affinity, such as sulfuric acid ($H_2SO_4$). This latter being also affected by contact with the air and difficult to pump is covered by a third liquid which may be readily pumped and come in contact with the air, but which has no affinity for the second liquid. For this third liquid I use petroleum. The different specific gravities are such as to cause them to remain one above the other in the order named and desired.

In detinning with stannic chlorin it is difficult to obtain tight joints between parts of the apparatus separated from each other, as, for instance, the cover of the detinning chamber. It is also difficult to regulate the temperature of the detinning chamber. In the apparatus for carrying out my process, these difficulties are obviated by providing a seal which resists the pressure when in use, being at that time in the form of a solid cement and is liquid when the parts are to be separated. With this seal I combine a coil through which steam or a cooling fluid can be passed, as desired, for melting or solidifying the seal, as required, and for controlling the temperature of the detinning chamber.

In order to avoid any disturbances when a vacuum is created above the stannic chlorid by mechanical means or by gravity causing the liquid to vaporize, I use a cooling chamber which is located sufficiently below the detinning chamber so that the liquid contained therein will not be drawn up when the vacuum is formed in the detinning chamber, having means to quickly reduce the temperature of the liquid and prevent its vaporizing so as to interfere with the forming of the vacuum or otherwise interfering with the carrying out of the process.

The following is a description of my process and apparatus for carrying it out, reference being had to the accompanying drawings, in which Figure 1 represents the apparatus, Fig. 2 represents a modification of the means for controlling the stannic chlorid.

Referring more particularly to the drawings, A represents the detinning chamber having within it the perforated removable basket B containing tin scrap. This chamber has a double wall forming a space surrounding the chamber, within which is a quantity of paraffin C, and also a coil D the upper end of which E is connected with a steam inlet controlled by the cock $e$, and a water outlet controlled by the cock $e'$. The lower end of this coil is connected with an outlet for condensed steam controlled by the cock $e^3$ and with an inlet for cold water controlled by the cock $e^4$. When steam is admitted to the coil D the paraffin is melted so that the cover A' with its depending flange can be easily removed. When the cover is in place and cold water is passed through the coil D, the paraffin is hardened so as to seal the cover with a solid cement, making an air and gas tight joint. The passage of the cold water through the coil D also reduces the temperature of the space within the chamber A. A pipe F enters the chamber from below and has at its upper end a terminal F' entering the cap $A^2$ of the cover A'. This terminal is connected with the portion F by a swivel joint $F^2$ so that it can be turned to one side in order to permit the removal and insertion of the basket B. A gage having a glass portion G has one end connected to the pipe F, and the other end connected to the bottom of the chamber A so as to indicate the height of the liquid within the chamber. The pipe F is branched, one branch leading to an air inlet H having an inwardly opening check valve H' and a cock $H^2$; and the other branch leading to an inlet I for admitting dry chlorin having an inwardly opening check valve I' and a stop cock $I^2$.

From the bottom of the detinning chamber leads a pipe J, which has a valve K and is connected to a vent pipe L having an outwardly opening check valve L' and a stop cock $L^2$. A second detinning chamber $A^{20}$ similar to the detinning chamber A is connected to the inlets H and I and the vent L by corresponding passages $F^{20}$ and $I^{20}$. A third detinning chamber $A^{30}$ is also connected to the inlets H and I and the vent L by pipes $F^{30}$ and $J^{30}$ corresponding to the pipes F and J, and having corresponding stop cocks.

The pipes J, $J^{20}$ and $J^{30}$ are connected by branches M', $M^2$ and $M^3$ to a purifying chamber N, which is surrounded by a water jacket O, through which cold water continually passes. The cover of this purifying chamber is connected with a vent pipe P having an outwardly opening check valve P'. The pipes M', M², M³ are provided with stop cocks m', m², m³. The purifying chamber is filled with pure tin N', in some finely divided form. A pipe Q passes through the bottom of the purifying chamber N nearly to the top thereof, and is provided with a stop cock Q'. This pipe leads to a holder R which contains a sufficient amount of anhydrous stannic chlorid to slightly more than fill the detinning chamber A. This holder is provided with a draw-off cock R' for drawing off the stannic chlorid as desired. The pipe Q' is provided with a second stop cock Q², around which is a by-pass containing a pump S. This by-pass has stop cocks S' S² so that the pump can be cut out when the stop cock Q² is open, and the stop cock Q² closed when the passage through the pump is open. The holder R has a double wall containing a liquid seal R², into which dips the flange of the counterweighted cover R³. The space within the cover above stannic chlorid is filled with an inert gas such as dry air. A gage having a glass portion T is connected with the holder R, the lower end of the gage being connected to the bottom of the holder R, and the upper end being connected with the pipe which extends above the stannic chlorid within the holder.

In Fig. 2 a modified form of the holder and means for handling the stannic chlorid is provided. In this form the pipe $q$ corresponding to the pipe Q in Fig. 1 is connected directly to the bottom of a holder Y provided within a draw-off cock Y'. This holder is of such size as to contain sufficient stannic chlorid to fill the chamber A, the stannic chlorid when the chamber A is empty rising to the point V², and also a slightly greater amount of some liquid of smaller specific gravity than stannic chlorid, and which will not combine therewith, such, for instance, as sulfuric acid, and also a layer of a still lighter fluid which will not combine with the sulfuric acid, such as petroleum. A gage having a glass portion V has its lower end connected with the lower part of the pipe $q$ and its upper portion opening into the holder Y above the lower line of the petroleum. The gage has within it divisions of petroleum, sulfuric acid and stannic chlorid which correspond in height to the divisions in the holder Y. From the upper end of the holder Y leads a pipe W, which is connected to the bottom of a second holder X having an air vent X'. The pipe W has two by-passes, one of which contains a stop cock W', while the other contains stop cocks W², W³ and a pump W⁴.

In carrying out my process by the apparatus of Fig. 1, the holder R must contain a sufficient amount of anhydrous stannic chlorid to fill the detinning chamber A, and the valves that would expose the tin chlorid to the action of the atmosphere must be closed. The cover over the detinning chamber is first removed, the paraffin seal C being first melted by the admission of steam to the steam coil D. The perforated metal basket B filled with the tin scrap is then placed in the detinning chamber A. The tin scrap should be dry. The cover is now replaced and the paraffin seal hardened by admitting cold water through the coil D instead of steam. The detinning chamber A²⁰ is filled with tin scrap and sealed from the atmosphere. A communication through the system of pipes from chamber A to chamber A²⁰ is made by opening valves H² H²⁰ in the piping connections from the top of chamber A toward the top of chamber A²⁰ and the valves K²⁰ and L²⁰ from the bottom of chamber A²⁰ to the vent L. The stannic chlorid is now forced up into the detinning chamber A until it has reached the top and driven out by displacement air and other gases through the pipes F F' and chamber A²⁰ and vent L. The valve H² is now closed and valves I² and Q² opened and the stannic chlorid allowed to quietly descend to the holder. Chlorin gas will now flow through the check valve I' and the valve I² into chamber A at constant pressure and fill the space above the descending stannic chlorid and act on the tin scrap. When all of the chlorid has descended and been withdrawn from the chamber, the chlorin will continue to flow in at constant pressure and detin the tin scrap, converting it into stannic chlorid until the inert gases unavoidably contained in the chlorin fill the chamber and prevent further entry of chlorin. During this process of absorbing the chlorin, cold water is kept in circulation through the coil D so as to absorb the heat of chemical action and control the temperature of the chamber, keeping it below boiling point of stannic chlorid. At the same time the chlorid is condensed on the tin scrap and on the cool walls of the chamber and runs down through the purifying chamber N into the holder. The presence of the purifying chamber results in always maintaining the tin chlorid within the holder free from dissolved chlorin and converts the hydrochloric acid (HCl) formed in the chamber into stannic chlorid. When the chlorin has ceased to flow into the chamber A, or the flow is very slow, the valve I² in the chlorin inlet is closed and valve H² opened, thus establishing again communication from chamber A with chamber A²⁰ and from chamber A²⁰ through valve L²⁰ to the vent. Stannic chlorin is now again pumped up into the chamber A and the inert gases driven out through chamber A²⁰ to the vent. The tin scrap being now submerged in stannic chlorid, the globules of stannic chlorid which would otherwise adhere to the tin scrap will be absorbed in the stannic chlorid and will be carried down into the holder R when the stannic chlorid is withdrawn. The valve H² is now again closed and I² opened and the stannic chlorid again allowed to return to the holder and the chlorin to again flow into the chamber to complete the operation of detinning. This operation is to be repeated as often as found necessary by observation to completely remove the tin from the tin scrap. When the detinning is completed the valve I² is closed and the valve H² opened and the gaseous contents of chamber A driven out to the vent through chamber A²⁰ by the stannic chlorid as previously described, the chlorin mixed with the gases driven out being absorbed by the tin on the tin scrap in chamber A²⁰. The valve H² is now closed and the stannic chlorid in chamber A allowed to return to the holder, which being situated a sufficient distance below the chamber A will act to create within that chamber a high degree of vacuum and the stannic chlorid remaining on the detinned scrap at the time of withdrawing the stannic chlorid (the chamber and contents having been kept at proper temperature) will be vaporized by the heat in itself and the heat in the detinned scrap mass and condensed on the walls of the chamber cooled by the circulation of water through the cooling coil. At the same time the stannic chlorid in the purifier must be sufficiently cooled to prevent evaporation which would otherwise occur on account of the lowered pressure. When the condensed stannic chlorid has drained out of chamber A the valve K immediately below it is closed and valve H² opened and air admitted through pipe H from the blower H³ to break the vacuum in the chamber and expel the gases. The air is preferably heated. The cooling water is now shut off from the coil D and steam turned in to it to melt the paraffin in the seal, the cover is removed and the basket with the detinned scrap taken out and another basket containing new tin scrap placed in the chamber. During the time that the stannic chlorid in chamber A is being condensed, the cover removed and the detinned scrap removed, new tin scrap is put into chamber A³⁰ and the cover replaced and sealed. The operation of detinning is now carried on in chamber A²⁰ venting into chamber A³⁰ the same as described for the operation of chamber A to chamber A²⁰, when connected with chamber A²⁰. Chamber A²⁰ is also used in connection with chamber A in the same way. From time to time the accumulation of tin chlorid in the holder is drawn off.

The arrangement of Fig. 2 is for the purpose of avoiding passing the stannic chlorid through a pump which is attended with some difficulties. In this apparatus the holder has a pipe connection from its lowest point to the purifier and a pipe connection from its highest point to the pump with a by-pass around the pump to the lowest point of another vessel open to the atmosphere at its highest point. Petroleum and another liquid as $H_2SO_4$ which is not affected by stannic chlorid, fills the space in the holder above the stannic chlorid; also there is sufficient petroleum in the other vessel to equal the contents of one of the detinning chambers. The stannic chlorid is caused to rise through the pipe A and the purifier filling the detinning chamber by pumping petroleum into the holder above the $H_2SO_4$ and $SnCl_4$ and forcing the former downward and the $SnCl_4$ out at the bottom and up into the detinning chambers.

The chambers and pipes etc. are preferably made of iron since it is but little attacked by the gases and liquids present.

The apparatus described but not claimed herein is claimed in my copending application Serial No. 345,815 filed Nov. 30, 1906 of which this is a division.

What I claim is:

1. The process of detinning tin scrap which consists in surrounding the scrap alternately with dry chlorin gas and with anhydrous stannic chlorid.

2. The process of detinning tin scrap which consists in surrounding the scrap with anhydrous stannic chlorid while in a closed chamber and thereby expelling the gases from said chamber and then withdrawing said stannic chlorid and surrounding said scrap with anhydrous chlorin gas.

3. The process of detinning tin scrap, which consists in surrounding the tin scrap with anhydrous chlorin gas in a closed chamber and expelling said gas by surrounding said scrap with anhydrous stannic chlorid.

4. The process of detinning tin scrap, which consists in surrounding the tin scrap with anhydrous chlorin gas in a closed chamber and expelling said gas by surrounding said scrap with anhydrous stannic chlorid and then creating a vacuum within the chamber containing said scrap.

5. The process of detinning tin scrap, which consists in surrounding the tin scrap with anhydrous chlorin gas in a closed chamber and expelling said gas by surrounding said scrap with anhydrous stannic chlorid, then creating a vacuum within the chamber containing said scrap and then cooling said chamber so as to condense any vapors therein.

6. The process of detinning tin scrap, which consists in surrounding the tin scrap with anhydrous chlorin gas in a closed chamber and expelling said gas by surrounding said scrap with anhydrous chlorin, then creating a vacuum within the chamber containing said scrap, then cooling said chamber so as to condense any vapors therein, and then admitting air to expel any remaining gases or vapors.

7. The process of detinning tin scrap, which consists in surrounding the tin scrap with anhydrous chlorin gas in a closed chamber and expelling said gas by surrounding said scrap with anhydrous chlorin, then creating a vacuum within the chamber containing said scrap, then cooling said chamber so as to condense any vapors therein, then admitting air to expel any remaining gases or vapors, and causing said gas and vapors to pass through another charge of tin scrap in another closed chamber.

8. The process of detinning tin scrap, which consists in causing stannic chlorid to flow into and out of a closed chamber containing tin scrap at the bottom of said chamber, causing inert gases to be expelled from said chamber by the inflowing of the chlorid and drawing dry chlorin gas into said chamber at the top thereof by the outflow of said chlorid.

9. In a process of detinning tin scrap, the improvement which consists in causing stannic chlorid to submerge tin scrap by causing an inert fluid of lesser specific gravity than stannic chlorid to exert a varying pressure on the stannic chlorid so as to displace an amount of said chlorid that is smaller than the amount of said inert fluid.

10. In a process of detinning tin scrap, the improvement which consists in causing stannic chlorid to submerge tin scrap by causing an inert fluid of lesser specific gravity than stannic chlorid to exert a varying pressure on the stannic chlorid so as to displace an amount of said chlorid that is smaller than the amount of said inert fluid through the varying pressure on a third fluid inert relatively to the said second fluid and of smaller specific gravity than said second fluid, the varying pressure of said fluid being brought about by mechanical means.

11. In a process of detinning tin scrap by chlorin, the improvements which consist in gradually exposing the tin scrap to chlorin by submerging in a relatively inert liquid and gradually withdrawing said liquid in the presence of chlorin.

12. The process of detinning tin scrap which consists in forcing all the gases out of the tin scrap by causing an inert liquid to rise so as to cover it and then drawing chlorin into the scrap by withdrawing said liquid in the presence of chlorin.

13. The process of detinning tin scrap which consists in converting the tin from tin scrap in a closed chamber into stannic chlorid by means of an anhydrous chlorin gas, expelling the gases from said chamber, creating a vacuum therein, condensing the vapors therein and maintaining the condensed vapors in liquid form by reason of the reduced temperature.

14. The process of detinning tin scrap which consists in converting the tin from tin scrap in a closed chamber into stannic chlorid by means of an anhydrous chlorin gas, expelling the gases from said chamber, creating a vacuum therein, condensing the vapors therein, maintaining the condensed vapors in liquid form by reason of the reduced temperature, and expelling the uncondensed vapors and gases by air prior to the opening of the chamber.

MEREDITH LEITCH.

Witnesses:
W. P. PALMER,
L. A. WELLES.